United States Patent [19]  [11] 3,987,813
Leczycki  [45] Oct. 26, 1976

[54] PRESETTABLE VALVE ACTUATOR

[75] Inventor: Moshe Leczycki, Tel Aviv, Israel

[73] Assignee: Plasson Maagan Michael Industries Limited, Kibbutz Maagan Michael, Israel

[22] Filed: June 26, 1975

[21] Appl. No.: 590,497

Related U.S. Application Data

[62] Division of Ser. No. 443,856, Feb. 19, 1974, Pat. No. 3,905,271.

[30] Foreign Application Priority Data

Feb. 26, 1973 Israel .................................. 41625

[52] U.S. Cl. .................................. 137/426; 137/434; 251/234
[51] Int. Cl.² ................................................ F16K 31/18
[58] Field of Search ................ 24/274 R, 275, 279; 85/32 V, 1 P; 151/7, 24, 27, 30, 44; 137/426, 434, 446, 447; 251/234

[56] References Cited
UNITED STATES PATENTS

| 279,685 | 6/1883 | Zane | 137/426 |
| 1,776,850 | 9/1930 | Cheswright | 24/274 R |
| 1,849,948 | 3/1932 | Müchler | 24/274 R |
| 1,969,645 | 8/1934 | Glenn | 137/446 |
| 2,061,703 | 11/1936 | Golden | 137/446 |
| 2,439,864 | 4/1948 | Ritchie | 137/434 |
| 2,730,118 | 1/1956 | Cowan | 251/234 |
| 3,142,310 | 7/1964 | Feldermann | 137/434 |
| 3,508,567 | 4/1970 | Kirk et al. | 251/234 |

FOREIGN PATENTS OR APPLICATIONS

| 58,954 | 4/1891 | Germany | 137/426 |
| 4,783 | 12/1909 | United Kingdom | 137/426 |
| 215,462 | 5/1924 | United Kingdom | 137/426 |

Primary Examiner—Martin P. Schwadron
Assistant Examiner—G. L. Walton
Attorney, Agent, or Firm—Benjamin J. Barish

[57] ABSTRACT

An actuator is described for a float-type valve, in which a screw and nut assembly is used to preset the position wherein the float arm engages the valve operator.

3 Claims, 4 Drawing Figures

PRESETTABLE VALVE ACTUATOR

RELATED APPLICATIONS

This application is a division of U.S. patent application Ser. No. 443,856, filed Feb. 19, 1974, now U.S. Pat. No. 3,905,271 granted Sept. 16, 1975.

BACKGROUND OF THE INVENTION

The present invention relates to a presettable valve actuator, and particularly to one useful with respect to a float-operated valve for controlling the level of water in a flushing cistern.

Flushing cisterns commonly include a float carried at one end of an arm, the opposite end of the arm being pivotably mounted to a valve and adapted to engage the valve operator for controlling the inflow of the water into the cistern so that the flow of water is terminated when the water reaches a predetermined level within the cistern. In the conventional construction, the float arm is made of metal, such as brass, and if it is desired to change the predetermined liquid level, this is usually done by bending the arm so that its actuating end engages the valve operator at the new desired liquid level.

OBJECTS AND SUMMARY OF THE INVENTION

An object of the present invention is to provide a valve actuator which may be more conveniently preset to control the valve so that the water assumes any desired liquid level within the cistern.

According to the invention of the present application, there is provided a valve actuator comprising an arm, a float carried at one end of the arm, the opposite end of the arm being pivotably mounted to a valve having an operator, and a screw and nut assembly carried at the pivotable end of the arm. The tip of the screw being engageable with the valve operator to actuate same and being threadably adjustable within the bore of the nut to preset its position with respect to the valve operator.

According to another feature, the screw includes an enlarged head formed with parallel axial grooves, the valve arm carrying a retainer element seatable in the grooves for retaining the screw in any preset position.

The screw and nut assembly is preferably of the construction described and claimed in my U.S. patent application Ser. No. 443,856 filed Feb. 19, 1974, now U.S. Pat. No. 3,905,271 granted Sept. 16, 1975.

An important advantage of the novel nut construction of that application is that it can be produced in volume and at low cost, e.g. by injection molding of plastic. The manufacture of the molds, and the production of the nuts using such molds, can both be done inexpensively particularly because of the arrangement wherein the spiral threads are formed only in the portion of the body member coextensive with the cut-out. Although in such an arrangement the nut threads engage the screw threads only for about one-half the circumference of the latter, the strength of such an assembly can be increased as desired by merely increasing the length of the threaded portion of the nut.

A valve actuator as constructed above can be easily preset by adjusting the screw with respect to the valve operator to cut-off the flow of the water at any desired level of water in the cistern. Another important advantage in such an arrangement is that is permits the float arm, as well as other parts, to be made of plastic rather than of bendable metal, as heretofore used for varying the liquid level in the tank.

BRIEF DESCRIPTION OF THE DRAWINGS

The invention is described below, for purposes of example, with reference to a preferred embodiment thereof illustrated in the accompanying drawings, wherein.

DESCRIPTION OF THE PREFERRED EMBODIMENT

Figure 1:
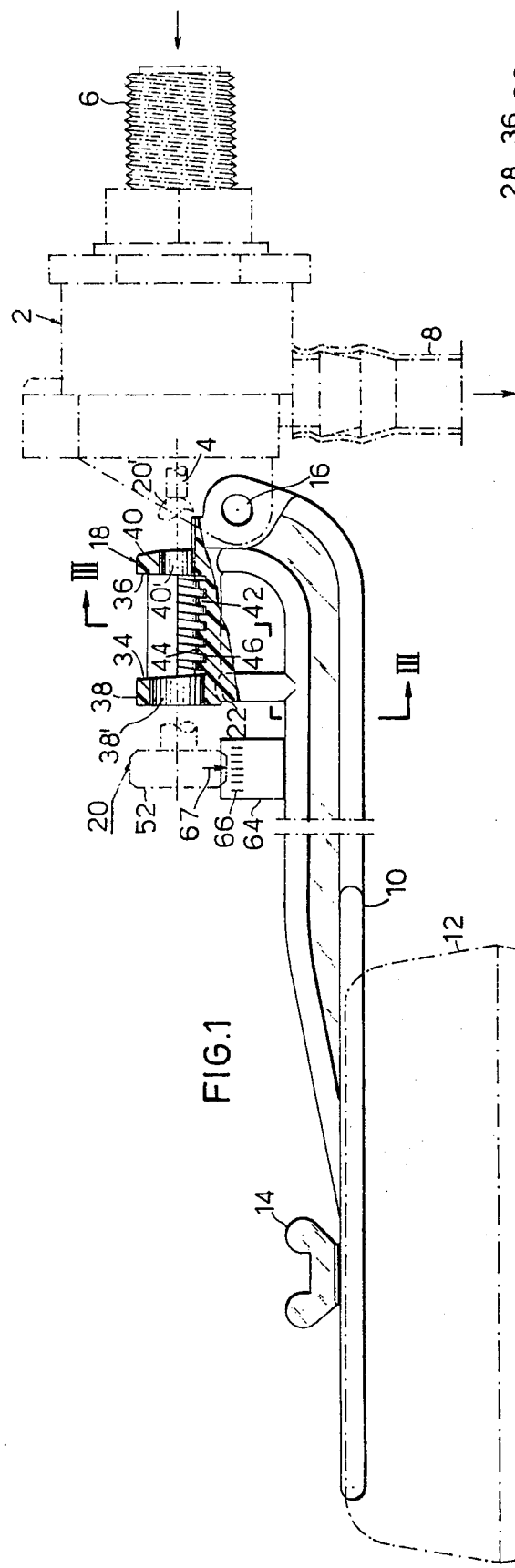
FIG. 1 is a side elevational view, partly in section, of a float type valve actuator including the novel nut and screw assembly constructed in accordance with the invention.
Figure 2:
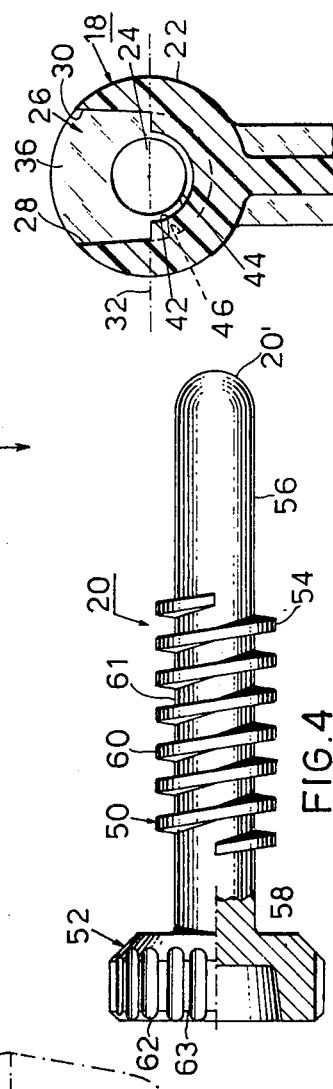
FIG. 2 is a top plan view of the valve actuator of FIG. 1.

The valve actuator illustrated in FIGS. 1 and 2 of the drawings is particularly designed for use in a flushing cistern, including a valve, generally designated 2, having an operator 4 which is actuated to control the flow of the water from inlet 6 through outlet 8 leading into the cistern. Valve operator 4 is normally in its projected position wherein valve 2 is open, and when the operator is engaged and depressed the valve is closed to terminate the flow of water therethrough.

The valve actuator for engaging operator 4 to terminate the flow of water comprises an arm 10 carrying a float 12 at one end, the float being removably attached by a wing-nut 14. The opposite end of arm 10 is pivotably mounted on pin 16 to the valve housing 2 adjacent to valve operator 4. The latter end of the arm carries an assembly including a nut 18 and screw 20, the tip 20' of the screw being engageable with the valve operator to actuate same. Screw 20 is threadily adjustable within nut 18 to preset the position thereof with respect to the valve operator. This permits changes in the valve-operating position of the float and thereby changes in the cistern water level.

The nut 18 part of the assembly comprises a body member 22 (FIG. 2) integrally formed with arm 10. Both are preferably made of plastic by injection molding. The body member 22 is formed with a cylindrical bore 24 extending longitudinally through the member, and with a cut-out 26 communicating with the bore and extending radially therefrom to one face of the body member 22 intermediate its ends.

Figure 3:
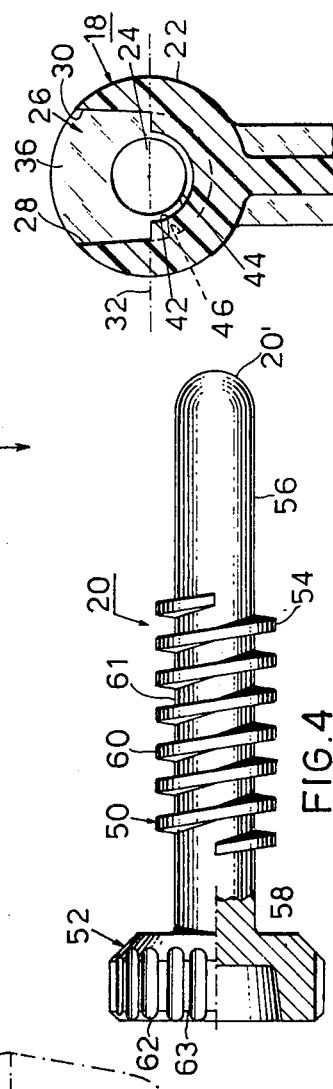
FIG. 3 is an enlarged sectional view along lines III-—III of FIG. 1.

Cut-out 26 is of rectangular shape (FIG. 2). Two opposed walls 28, 30 (FIG. 3) of the cut-out intersect bore 24 along a pair of parallel planes substantially tangential to the bore and perpendicular to the transverse axis 32 thereof. The other two walls 34, 36 (FIG. 1) of the cut-out intersect the bore along a pair of parallel planes also substantially perpendicular to the transverse axis 32 of the bore, and intermediate the bore ends as noted above, to define a pair of end walls 38, 40.

The portion of bore 24 coextensive with cut-out 26 is formed with a plurality of spiral threads 42. Both the crests 44 of the threads defining the minor diameter thereof, and the roots 46 defining the major diameter thereof, are preferably flat. The portions of bore 24 extending through end walls 38 and 40 of the body member are unthreaded and of different diameters.

Thus, bore portion 38' through end wall 38 is of a diameter equal to the major diameter (root 46) of spiral threads 42, and bore portion 40' formed through end wall 40 is of a diameter equal to the minor diameter (crest 44) of the spiral threads.

Figure 4:
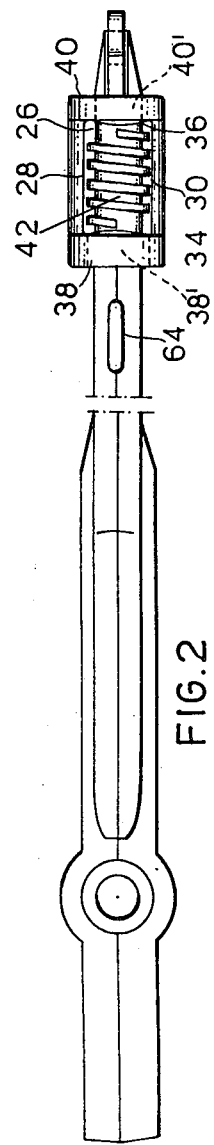
FIG. 4 is a side elevational view, partly in section of the screw used in the valve actuator of FIG. 1.

Screw 20 (FIG. 4) comprises a threaded shank 50 and an enlarged head 52. Shank 50 is formed with threads 54 only along a portion of its length. The tip end 56 of the shank, and the portion 58 thereof joined with head 52, are both unthreaded. The threads 54 are dimensioned to mate with the threads 42 of nut 18, with the crests 60 being flat and equal to the major diameter of nut threads 42, and the roots 61 also being flat and equal to the minor diameter of nut threads 42. The unthreaded end 56 and unthreaded portion 58 of the shank are both of a diameter equal to that of root 61, namely equal to the minor diameter of the nut threads 42.

Head 52 of screw 20 is formed with a plurality of axial ribs 62 to define a plurality of axial grooves 63. These grooves are cooperable with a retainer element or tab 64 (FIGS. 1, 2) carried by arm 10. The tab is seatable in the grooves 63 of the screw for retaining the screw in any preset position.

In using the valve actuator illustrated in the drawings, it will be appreciated that valve operator 4 will be actuated by tip 20' of screw 20 when arm 10, which pivots up and down with the rise and fall of float 12 in the water, assumes a predetermined position. When this position is reached, tip 20' engages valve operator 4 to turn-off the flow of water into the cistern. The position of tip 20' may be preset by rotating screw 20 within nut 18, the screw being retained in its preset position by retainer element 64 seated within one of the axial grooves 63 on the head of the screw. Retainer element 64 may be provided with graduation markings 66 (FIG. 1) cooperable with an arrow 67 on screw head 52 to indicate the different water levels.

The level of the liquid within the cistern in which the valve actuator is used may thus be changed by merely adjusting screw 20. Since this adjustment may easily be made without bendng the float-arm, as required in the previously used devices mentioned above, the float arm 10 as well as most or all of the other parts may be made of plastic material, which is highly advantageous when volume low-cost production is desired. Preferably, all the illustrated parts are made of plastic except screw 20 which may be of brass.

If desired, a lock nut could be provided instead of retainer element 64 for locking the position of the screw 20.

It will be appreciated that the nut illustrated has an advantageous construction over conventional nuts particularly enabling it to be made of injection molded plastic, and therefore it could be used in many other applications. Besides plastic material, the nut could also be made of cast metal, for example.

Many modifications, variations, and other applications of the illustrated embodiment will be apparent.

What is claimed is:

1. A valve actuator comprising an arm, a float carried at one end of the arm, the opposite end of the arm being pivotably mounted to a valve having an operator, and a screw and nut assembly carried at said pivotable end of the arm, the tip of the screw being engageable with the valve operator to actuate same and being threadably adjustable within the bore of the nut to preset the position thereof with respect to the valve operator, said screw including an enlarged head formed with parallel axial grooves, the valve arm carrying a retainer element seatable in the grooves for retaining the screw in any preset position.

2. A valve actuator according to claim 1, wherein the nut comprises a body member formed with a cylindrical bore extending longitudinally therethrough, and with a cut-out communicating with the bore and extending radially therefrom through one face of the body member intermediate its end, said cut-out intersecting the bore along a pair of parallel planes substantially tangential to the bore and perpendicular to the transverse axis thereof, the portion of the bore coextensive with said cut-out being formed with a plurality of spiral threads, the portions of the bore extending through the ends of the body member being unthreaded.

3. A valve actuator according to claim 2, wherein said screw is formed with threads dimensioned to mate with the threads of the nut, the unthreaded shank portions of the screw being of an outer diameter equal to or less than that of the respective unthreaded bore portions of the nut.

* * * * *